March 23, 1948.   H. A. WHEELER   2,438,197
PHASE-SELECTIVE VARIABLE-FREQUENCY OSCILLATORY SYSTEM
Filed Dec. 31, 1942    2 Sheets—Sheet 1

INVENTOR
HAROLD A. WHEELER
BY *Harry C. Page*
ATTORNEY

INVENTOR
HAROLD A. WHEELER

Patented Mar. 23, 1948

2,438,197

UNITED STATES PATENT OFFICE 2,438,197

PHASE-SELECTIVE VARIABLE-FREQUENCY OSCILLATORY SYSTEM

Harold A. Wheeler, Great Neck, N. Y., assignor, by mesne assignments, to Hazeltine Research, Inc., Chicago, Ill., a corporation of Illinois Application December 31, 1942, Serial No. 470,786

19 Claims. (Cl. 250—36)

The present invention relates to electrical indicating systems for indicating unbalanced components of coupling in a normally-balanced system. In greater particularity, the invention relates to electrical indicating systems of the type in which variations of a coupling effect in an impedance network of the system is utilized to produce an indication. While the invention is of general utility, it is particularly suitable for use in a system for indicating the presence of a hidden mass of material of such nature as to have a different effect in unbalancing the system than does the surrounding substance, for example for locating metal objects buried a short distance underground, and will be described in that connection.

It is frequently desirable to provide an electrical system which is initially balanced, but which is sensitive to unbalance and provides a desired indication in response to some change of condition causing an unbalance. Certain systems of this nature contain reactance components and resistance components and an unbalance of the system may be caused by a change in the value of either type of component. In particular cases, only the unbalance of one type of component is of interest, and that of the other type of component should be ignored. In such case, it is desirable that the indicating system be "phase-selective;" that is, that it provide the desired indication only in response to an unbalance of the component of interest. It is also desirable that an automatic rebalancing arrangement be provided in the system which will compensate for unbalance of the component which is not of interest without affecting any unbalance of the component of interest.

An example of such electrical indicating systems is to be found in devices for detecting the presence of a hidden mass of material having an electrical characteristic which distinguishes it from the substance which surrounds it. In particular, such systems are used to locate bodies of ore or to detect metal objects such as pipes and electrical conductors which are buried in the ground. Advantage is taken of either the magnetic permeability or the electric conductivity of the mass of material to cause an unbalance of coupling between exposed coils, leading to an indication distinguishable from that caused by the electrical characteristics of the surrounding substance. Ordinary dry ground produces by its slight magnetic effect mainly a reactance component of unbalance in such systems at all audio-frequencies while salt water produces mainly a resistance component of unbalance at low audio-frequencies. If the system is phase-selective, the conductivity characteristic of a metal body may be utilized to locate such a body buried in dry ground, whereas the permeability characteristic may be utilized if the body is of magnetic material and is submerged in salt water.

The electrical indicating system of the copending application of Leslie F. Curtis, Serial No. 425,155, filed December 31, 1941, now abandoned and assigned to the same assignee as the present application, is of the phase-selective type. An oscillator is provided with a main feed-back path for producing sustained oscillations and an auxiliary feed-back path is provided for shifting the frequency of the oscillations in response to one phase of unbalance in the detecting system. The auxiliary feed-back path includes a pair of coils, having negligible inductive coupling, and an amplifier. The auxiliary path is so phased relative to the main feed-back path that the system is normally balanced but becomes unbalanced if the coupling between the coils is changed in a certain phase, as by a metallic body brought into the vicinity thereof. On becoming thus unbalanced, the coupling through the auxiliary path changes the frequency of the generated oscillations and suitable means is provided for observing the change of oscillator frequency to indicate the proximity of the metallic body. The sensitivity of this arrangement is greatly enhanced by the use of an amplifier in the auxiliary feed-back path for the purpose of amplifying the unbalance component which causes the change of oscillator frequency. The relative phases of coupling in the main and auxiliary feed-back paths must be maintained if the system is to be unresponsive to one component of unbalance, as for example the resistance component, and responsive to the other component, for example the reactance component. This requires considerable accuracy in the design and adjustment of the amplifier circuits in the auxiliary feed-back path.

It is an object of the present invention to provide a new electrical indicating system of the type described, improved in performance and stability but simplified in construction.

It is a further object of the invention to provide a new and improved electrical indicating system of the type described which avoids the necessity for any critical relative phasing of a plurality of circuits to maintain its phase-selective properties.

It is an additional object of the invention to provide a new and improved electrical indicating system of the type described having a high degree of phase selection by which to detect and indicate a small component of unbalance of a certain phase while being unresponsive to components of unbalance of quadrature phase.

It is a further object of the invention to provide an improved electrical indicating system of the type described which requires a minimum number of initial adjustments to place the system in an operative condition of balance sensitive to unbalance.

In accordance with the invention, a variable-frequency oscillatory system comprises a stable amplifier having input and output terminals and having substantial amplification and a positive phase slope over a predetermined frequency range. The system includes a single feed-back path substantially nonselective over this frequency range coupling the amplifier output terminals to its input terminals, means included in the feed-back path for establishing a feed-back component of coupling of a type effective primarily to cause sustained oscillation of the amplifier at a frequency in the aforesaid range but ineffective to cause substantial variations of the oscillation frequency of the amplifier with variations of the component. The system also includes means in the feed-back path for establishing a second component of feed-back coupling substantially independent of and in quadrature relation to the first-mentioned component, the second component being variable in response to a frequency-control condition external to the last-mentioned means and being effective primarily to cause variations of the frequency of oscillation in accordance with variations of the condition.

In a particular form of the invention, the aforesaid components of coupling comprise, respectively, reactance and resistance components of coupling and the aforesaid feed-back path includes a coupling impedance having two portions which individually provide the components of coupling. This coupling impedance comprises an auxiliary primary impedance providing primarily the aforesaid one component of coupling and a pair of inductors normally having substantially no mutual inductive coupling but becoming coupled to provide primarily the aforesaid other component of coupling in response to the aforementioned condition.

For a better understanding of the present invention, together with other and further objects thereof, reference is had to the following description taken in connection with the accompanying drawings, and its scope will be pointed out in the appended claims.

Referring now to the drawings.

Figure 1:
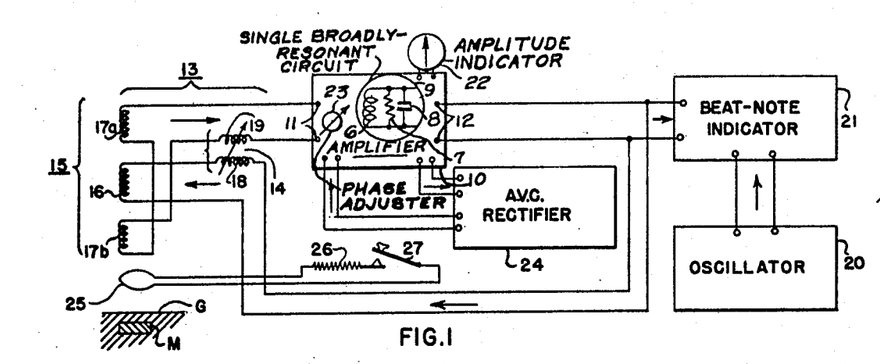
Fig. 1 is a circuit diagram, partly schematic, of a complete electrical indicating system embodying the present invention.

Referring more particularly to Fig. 1 of the drawings, there is represented a complete electrical indicating system embodying the present invention in a preferred form. The system includes a stable amplifier 10 of one or more stages having input terminals 11 and output terminals 12 and having substantial amplification and a positive phase slope over a predetermined frequency range which may be an audible-frequency range. The values of phase slope of the amplifier 10 preferably are substantially independent of the amplitude of oscillations of the amplifier. The optimum circuit design and circuit constants of amplifier 10 depend mainly on the operating frequency. If the operating frequency is to be an audio frequency, for example 1,000 cycles, the amplifier is much like a conventional audio amplifier except that it preferably includes a single resonant circuit 9, which may include in parallel-connected relation an inductor 6, a resistor 7 and a condenser 8, very broadly tuned to 1,000 cycles. If the amplifier includes several stages, one stage should be broadly tuned as stated and the remaining stages preferably should have as little phase shift as possible over the range of response of the amplifier. Conventional amplifiers having these characteristics are described in "Radio Engineering" by Terman, second edition, pages 261 and 262 (McGraw-Hill Book Company, New York and London). On the other hand, if the operating frequency is a radio frequency, for example 100 kilocycles, the amplifier is much like a conventional intermediate-frequency amplifier of a radio receiver. In this case, it is also preferable that the selectivity of the amplifier be provided by a single tuned circuit having a relatively broad resonance characteristic and that all other stages of a plural-stage amplifier provide relatively little selectivity or phase shift. Where the system is used to locate buried metallic bodies or bodies of ore in the ground, it has been found that lower operating frequencies provide greater depth of penetration in the ground and a frequency of 1,000 cycles has been found satisfactory for metallic objects buried several feet under the surface of the ground.

The indicating system also includes a single feed-back path including a coupling impedance 13, substantially nonselective over the operating frequency range of the amplifier 10, coupling the amplifier output terminals 12 to its input terminals 11. This feed-back path has, by virtue of the coupling impedance 13, quadrature-related components of coupling of which one component, hereinafter called the "major" component, is effective to cause sustained oscillations of the amplifier 10 at a frequency in the range of operation of the system, and the other component, hereinafter called the "minor" component, is variable in response to conditions to be indicated and is effective to cause variations of the frequency of oscillation in accordance with variations of the magnitude of the minor component of coupling. These major and minor components of coupling are preferably provided by individual ones of two portions of the coupling impedance 13, one portion comprising an auxiliary reference impedance 14, which provides mainly the major component of coupling, and the second portion comprising an exploring unit 15, which normally has substantially no coupling between its two separate inductors or sections 16 and 17a—17b but furnishes coupling in response to a condition to be indicated to provide primarily the minor component of coupling.

The reference impedance 14 comprises a pair of coupled inductors 18, 19 arranged as a transformer, the coupling between the inductors being adjustable as indicated by the arrow. The inductor 18 may be considered the primary inductor of this transformer arrangement and is connected in series with inductor 16 in a primary circuit which is coupled to the output circuit terminals 12 of the amplifier 10. Similarly, the inductor 19 of impedance 14 may be considered the secondary of the transformer arrangement and is connected in series with the inductor or sections 17a—17b in what may be considered a secondary circuit which is coupled to the input circuit terminals 11 of the amplifier 10. The design and construction of a preferred type of exploring unit 15 is described and claimed in the copending application of Harold A. Wheeler, Serial No. 470,785, filed concurrently herewith, and assigned to the same assignee as the instant application. This arrangement of the exploring unit 15 is one in which the inductors 16 and 17a—17b are supported in concentric and coplanar relation as a unitary structure, the inductor sections 17a and 17b being of different diameters and connected with opposing fields and the inductor 16 being of an intermediate diameter. This construction has numerous advantages, one of which is that the exploring unit 15 is adapted to be readily carried a few inches above the surface of the ground G in search of a buried metallic body M.

The indicating system of the invention additionally includes means responsive to the frequency of oscillation of the amplifier 10 for indicating variations of the minor component of coupling caused by variations of a condition to be indicated. This means comprises an oscillator 20, having a substantially constant frequency $f_0$ located at the center of the range of operation of the amplifier 10, and means for simultaneously audibly reproducing at substantially the same volume the oscillations of the amplifier 10 and those of oscillator 20 to indicate variations of the minor component of coupling caused by variations of the condition to be indicated. This last-named means comprises a beat-note indicator 21 having a first input circuit coupled to the output circuit terminals 12 of the amplifier 10 and having a second input circuit coupled to the output circuit of the oscillator 20. The indicator 21 may include any suitable means, for example a nonlinear detector, for deriving a beat note from the oscillations of the amplifier 10 and those of oscillator 20 and includes a pair of headphones or a loudspeaker for audibly reproducing the beat note thus developed. Variations of the major component of coupling may be indicated, if desired, by a suitable indicating device 22 which is coupled to an output circuit of amplifier 10 and is responsive to the amplitude of the oscillations produced by amplifier 10.

As will presently be explained in greater detail, the amplifier 10 oscillates at a frequency such that the addition of all phase shifts through both the amplifier and the feed-back path is zero. The indicating system is provided with means included in the amplifier 10 for adjusting the amount of phase shift through the amplifier from the input terminals 11 to the output terminals 12. This adjustment is therefore effective to adjust the frequency of oscillation of the amplifier. This means is indicated schematically in Fig. 1 as a manually adjustable control or phase adjustor 23 and in practice may comprise an impedance network included in the translating channel of the amplifier 10 and having one or more adjustable impedance elements which determine the phase shift of oscillations translated by the network. The phase adjustor 23 may be provided with a calibrated scale in order that it may be used to provide an indication of the change of phase angle needed to compensate for an object in the neighborhood of the search coil 15.

There is additionally included in the indicating system means responsive to the amplitude of oscillation of the amplifier 10 for automatically adjusting the magnitude of the major component of coupling provided by the feed-back path inversely with amplitude variation to maintain the oscillation amplitude of the amplifier 10 substantially constant. This means comprises an automatic volume control or A. V. C. rectifier 24 having an input circuit coupled to the output circuit of the amplifier 10 and having an output circuit which is coupled to the input circuit of one or more of the tubes of amplifier 10 in conventional manner. While the amplitude of oscillation of the amplifier 10 may be limited merely by overloading, there is some advantage in providing the A. V. C. rectifier 24 particularly in that the amplitude of oscillation of the amplifier may be maintained within the range of its linear amplification. It is desirable that the phase shift in the amplifier 10 be independent of the amplitude of its oscillation and the A. V. C. rectifier 24 contributes to this result.

In order that the operativeness of the entire indicating system may be tested from time to time as desired, a single turn of wire 25 is fixedly positioned in concentric and coplanar relation with the inductors of the exploring unit 15 and is included in a series circuit comprising a resistor 26 and a manually operable key or push button 27.

Figures 2, 3:
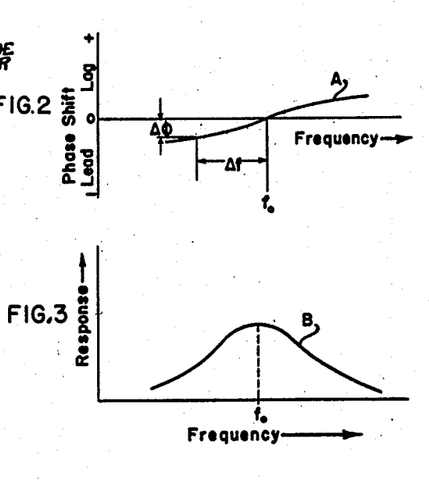
Fig. 2 is a graph representing the phase-slope characteristic of an amplifier included in the system.
Fig. 3 is a graph representing the frequency-response characteristic of the amplifier.

Considering now the operation of the Fig. 1 arrangement, and referring to the graph of Fig. 2, the amplifier 10 has a positive phase slope over its operating frequency range, as represented by curve A. Its phase slope must be substantial and in the same direction over the operating frequency range, as indicated by curve A. The smaller the phase slope, however, the greater the sensitivity of the indicating system as long as the phase slope meets the requirement that it be a controlling parameter, or "substantial." The useful range of phase angle is generally between ±90 degrees and the phase slope is made small by securing this variation of phase angle over a wide range of frequency. It will be seen from Fig. 2 that a small phase shift $\Delta\phi$ produces a relatively large change of frequency $\Delta f$. A phase-shift characteristic of this nature is inherent in a broadly tuned amplifier; that is, an amplifier having a broad frequency-response characteristic of the type represented by curve B of Fig. 3. As previously stated, this characteristic is preferably provided by a single broadly resonant circuit provided in the amplifier 10.

The exploring unit 15 is so constructed that inductors 16 and 17a—17b normally have substantially no coupling. Hence, the only coupling between the output and input circuits of the amplifier 10 is that provided by the reference impedance 14 which, by virtue of the fact that its inductors 18 and 19 are coupled only inductively, provides a major component of coupling which is, therefore, a reactance component at all frequencies. This reactive component of coupling is made sufficiently large to cause the amplifier 10 to oscillate, the frequency of oscillation being that value which produces zero phase shift of oscillations translated from output terminals 12 of amplifier 10 through the feed-back path including reference impedance 14 to the input terminals 11 of the amplifier and through the amplifier 10 to its output terminals.

Assuming that the coupling between inductors 18 and 19 of reference impedance 14 has been adjusted to cause the amplifier 10 to oscillate strongly, the indicating system is initially adjusted for operation by adjustment of the phase adjustor 23 to provide a phase shift in adjustor 23 of approximately 90 degrees to compensate the 90-degree phase shift introduced by the reference impedance 14, whereby the frequency of oscillation of the amplifier 10 is $f_0$, Figs. 2 and 3. The reactance component of coupling provided by the reference impedance 14 is then adjusted to a value about twice that required to maintain the amplifier 10 in an oscillatory state. The oscillator 20 is then adjusted, if necessary, to the frequency of oscillation of amplifier 10. With these simple adjustments completed, the indicating system is ready for operation.

If, now, the exploring unit 15 is brought into the vicinity of a metallic object, for example a buried metal object M, the coupling between its inductors 16 and 17a—17b is disturbed and the inductors are no longer uncoupled. A conductive object, such as a metallic body, causes these inductors to have a large resistance component and a small reactance component of coupling. On the other hand, the magnetic material in ordinary dry ground causes the inductors to have mainly a small reactance component of coupling. The inductors 16 and 17a—17b of the exploring unit 15 are connected with such polarity in the indicating system that any reactance component of coupling between the inductors of the exploring unit 15 merely adds to that provided by the reference impedance 14 and consequently affects only the amplitude of the oscillations produced by amplifier 10. The reactance component of exploring unit 15 is not sufficient materially to change the amplitude of oscillation, however, due to the action of the A. V. C. rectifier 24 which operates to maintain the oscillation amplitude substantially constant.

Any resistance component of coupling between the inductors of exploring unit 15, on the other hand, has a quadrature relation to the reactance component of coupling and hence produces a change of phase of the oscillations translated through the feed-back path. When this phase change occurs, the phase shift of oscillations translated through both the feed-back path and the amplifier 10 no longer is zero. The amplifier 10 consequently changes its frequency of oscillation to a new value such that the phase shift occurring in the amplifier itself at the new frequency, for example the phase shift $\Delta\phi$ resulting from the change of frequency $\Delta f$, Fig. 2, just compensates for the phase shift produced by the resistance component of coupling occurring in the exploring unit 15. The frequency of oscillation of the amplifier 10 is then no longer equal to that of the oscillator 20 and a beat note is consequently produced by the beat-note indicator 21 to provide an audible indication of the presence in the vicinity of the exploring unit 15 of a metallic body, for example the buried metal body M.

The phase adjustor 23 may now be so adjusted as to compensate for the change of phase shift of the oscillations translated through the feed-back path due to the presence of the conductive object M in the vicinity of the exploring unit 15. If this is done, the frequency of oscillation of the amplifier 10 returns to its initial value $f_0$ and the frequency of the beat note is reduced to zero. The necessary change of phase shift of the phase adjustor 23 to produce this result is a measure of the magnitude of the resistance component of coupling produced between the conductors of the exploring unit 15 by the conductive object M and, hence, provides a measure of the distance from the exploring unit 15 of a conductive body of known size and material. The phase adjustor 23 is preferably so calibrated over its range of adjustment.

Figure 4:
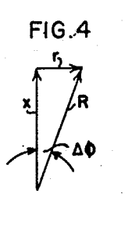
Fig. 4 is a vector diagram representing components of coupling occurring at certain points in the system.

The relations between the reactance and resistance components of coupling occurring in the feed-back path are shown more clearly by the vector diagram of Fig. 4. The vector $x$ represents the reactance component of coupling provided by the reference impedance 14 and any additional generally small reactance component of coupling occurring in the exploring unit 15. The resistance component of coupling is in quadrature relation to the reactance component and is represented by the vector $r$, the resistance component being produced as previously explained by a conductive metallic body in the vicinity of the exploring unit 15. The total feed-back provided by the feed-back path is the vectorial sum of the reactance and resistance components and is represented by the vector R. The phase angle $\Delta\phi$ between the resultant feedback when a resistance component is present and the feedback without this component is the phase shift produced in the feed-back path by a conductive metallic body in the vicinity of the exploring unit 15 and is the phase shift for which the amplifier 10 compensates by a change of its frequency of oscillation. It will be evident from these vectorial relationships that, for greater sensitivity of the indicating system, it is desirable to make the reactance component as small as possible in comparison with the magnitude of the resistance component which will normally be encountered in the use of the system. Large amplification is desired in amplifier 10, to cause it to oscillate with this small reactance component of coupling. Additionally, for any particular kind of conductive object there is an optimum frequency at which the resistance and reactance components produced in exploring unit 15 are approximately equal and resultant phase-angle change of the feedback is a maximum. Hence, it is preferable to operate the system at a frequency which provides the largest possible ratio of resistance component to reactance component to obtain optimum sensitivity.

Closure of the key 27 produces a resistance component of coupling in the exploring unit 15 and the resultant change of oscillation frequency of amplifier 10 provides an indication that the overall indicating system is operating properly. The value of the resistor 26 may be so chosen that this change of frequency corresponds to the same change produced by a conductive object at a known distance from the exploring unit 15. The change of frequency caused by a conductive body at an unknown distance from the exploring unit 15 may then be compared to the change of frequency caused upon closure of the key 27 after the exploring unit 15 has been moved out of the vicinity of the conductive body and these comparative indications are useful in estimating the distance or size of the conductive body from the the exploring unit 15 at the time the first indication was obtained.

The mechanical construction of the exploring unit 15 may involve the use of metallic screws and metallic structural members which introduce an undesired fixed resistance component of coupling between the inductors of the exploring unit 15. This coupling may be compensated by a compensator, not shown, having a pair of coupled inductors. One of the compensator inductors is serially included in circuit with the inductors 16 and 18 and the second inductor of the compensator is serially included in circuit with the inductors 19 and 17a—17b. The coupling between the inductors of the compensator is varied by an adjustable conductive member having a ratio of inductive reactance to resistance much less than unity. This member may, for example, be a thin-walled brass cylinder. A compensator of this type is disclosed and claimed in the copending application of Leslie F. Curtis, Serial No. 470,773, filed concurrently herewith, now United States Letters Patent No. 2,396,831, granted March 19, 1946.

Figure 5:
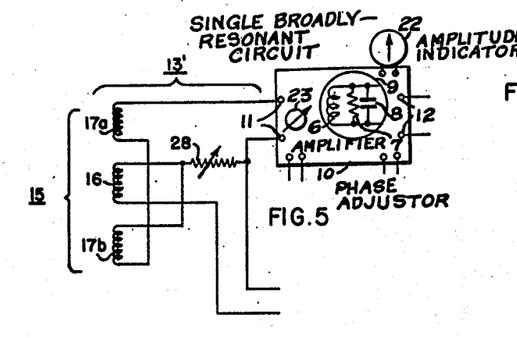
Fig. 5 is a circuit diagram of a portion of an electrical indicating system embodying a modified form of the invention.

Applications may arise where it is desirable to use the indicating system of the invention to measure the properties of dry ground, for example its magnetic properties, or to detect the presence of magnetic ore such as magnetite, or to locate an object exhibiting magnetic permeability which is submerged in salt water, the latter causing mainly a resistance component of coupling where the indicating system operates at a low audio-frequency. Fig. 5 is a circuit diagram of a portion of the indicating system shown in Fig. 1, similar circuit elements being designated by similar reference numerals, and represents a modified form of the invention suitable for this purpose. In this modification, the coupling impedance 13' comprises an adjustable resistor 28 which is included in a circuit portion common to each of the inductors 16 and 17a—17b of exploring unit 15 and provides primarily the major component of coupling effective to cause sustained oscillation of the amplifier 10. In this case, the major component of coupling is a resistance component and the phase adjuster 23 is adjusted to have substantially zero phase shift at the frequency $f_0$.

The operation of this modified form of the invention is essentially similar to that of Fig. 1, the system being initially adjusted for operation by adjusting the resistor 28 to a value about twice that necessary to produce sustained oscillation of the amplifier 10 and the phase adjustor 23 being adjusted to cause the amplifier 10 to oscillate at the frequency $f_0$ where it causes no phase shift of the oscillations translated through the amplifier. As before, the amplifier 10 oscillates at a frequency such that the phase shift of oscillations translated from the output terminals 12 of amplifier 10 through the feed-back path and through the amplifier 10 to the output terminals is zero. The resistor 28 is now the reference impedance and determines which type of coupling component is effective to cause oscillations of the amplifier 10 and which type is effective to vary the frequency of oscillation. Since the resistor 28 provides primarily a resistance component of coupling, additional resistance components of coupling occurring in the exploring unit 15 are effective only to change the amplitude of oscillation of amplifier 10, whereas reactance components of coupling occurring in the exploring unit 15 are effective to shift the frequency of oscillation. A body exhibiting magnetic permeability causes primarily a reactance component of coupling to occur between the inductors of exploring unit 15. Hence, this modified form of the indicating system is particularly useful in locating a body which possesses magnetic permeability characteristics. For example, a body of iron submerged in salt water is readily located by an indicating system embodying this modified form of the invention, the salt water causing mainly a resistance component of coupling in the exploring unit 15 thus affecting only the amplitude of oscillation of the amplifier 10, whereas the body of iron produces a reactance component of coupling in the exploring unit and consequently is effective to change the frequency of oscillation thus to provide an indication of its proximity to the exploring unit 15. A low frequency is preferably employed to minimize the effect of the conductivity of the iron and water so that they do not tend unduly to change the amplitude of oscillation of amplifier 10.

The Figs. 1 and 5 arrangements embody the invention in perhaps its simplest forms. They have the limitation, however, that a certain amount of coupling produced in exploring unit 15 by external conditions may cause the amplifier 10 to stop oscillating if such coupling is sufficiently large and of phase opposing that of the reference impedance 14. In this connection, it may be noted that it is possible to get such coupling in opposing phase because either polarity of coupling may result from objects in various positions relative to the exploring unit 15. This limitation is avoided in the modified form of the invention shown in Fig. 6 which is otherwise similar to the Fig. 1 arrangement, similar circuit elements being designated by similar reference numerals. It differs in that there is provided means responsive to the amplitude of oscillation of the amplifier for automatically adjusting the magnitude of the major component of coupling, in this case the reactance component of coupling, inversely with the amplitude of oscillation to maintain the oscillation amplitude of the amplifier 10 nearly constant. This means, in the present modification, comprises a bias-controlled repeater 29 included in the feed-back path and means for controlling the repeating ratio of the repeater 29 inversely in accordance with the oscillation amplitude. The repeater 29 comprises a pair of vacuum tubes 30, 31 having their input electrodes coupled in push-pull with a pair of resistors 32, 33, respectively, which are serially connected in the primary or output circuit of the amplifier 10. The output electrodes of tubes 30 and 31 are coupled in push-pull through a transformer 34 to the input circuit terminals 11 of the amplifier 10 to modify the major or reactance component of coupling provided by the reference impedance 14 and which is effective to cause sustained oscillation of the amplifier 10. A direct current meter 35 is included in the anode and screen electrode circuits of the tubes 30 and 31 and is used in a manner presently to be described initially to adjust the system for operation.

Figures 6, 7:
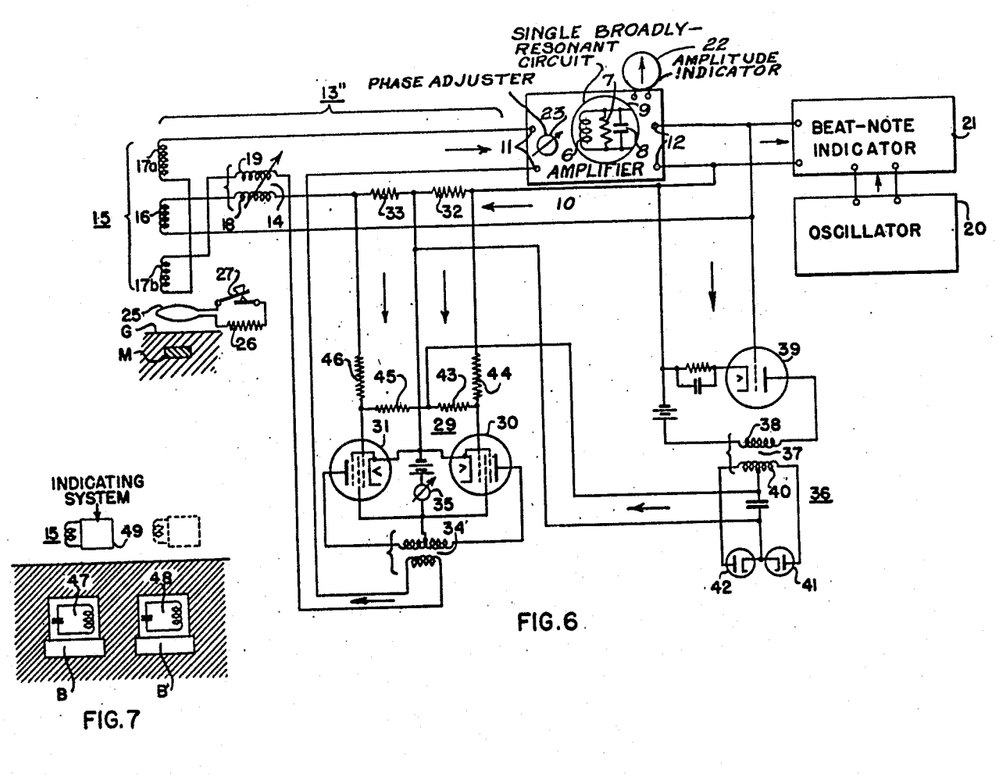
Fig. 6 is a circuit diagram, partly schematic, of a complete electrical indicating system embodying the present invention in an additionally modified form.
Fig. 7 represents a novel application of the invention.

This modified form of the indicating system also includes a balanced rectifier 36 coupled to the output terminals 12 of the amplifier 10 to derive a control effect or bias varying with the amplitude of oscillation of the amplifier and means for applying the control effect or bias in the same polarity to the input electrodes of the vacuum tubes 30 and 31 to maintain the amplitude of oscillation of the amplifier 10 substantially constant. The rectifier 36 comprises a transformer 37 having a primary winding 38 coupled through a vacuum-tube repeater 39 to the output-circuit terminals 12 of the amplifier 10. The transformer 37 has a center-tapped secondary winding 40, the end terminals of which are individually connected to the anodes of a pair of diode rectifiers 41, 42. A common load impedance is provided for the rectifiers 41 and 42 and comprises two parallel resistor networks, one of which includes in series a resistor 43, a resistor 44 and the resistor 32, and the other network including in series a resistor 45, a resistor 46 and the resistor 33. The resistors 43 and 45 of this load network are connected in series between the control electrodes of vacuum tubes 30 and 31 while the resistors 44 and 46 are included in individual ones of the control-electrode circuits of these tubes.

The operation of this modification of the invention is essentially similar to that of Fig. 1 with the exception that in the present arrangement two reactive components of coupling are applied through the single feed-back path from the output to the input circuit of the amplifier 10. One reactive component of coupling is provided by the reference impedance 14 while the other is provided by the automatic amplitude-control system comprising the repeater 29 and rectifier 36.

The repeater 29 provides the second reactive component of coupling as follows: Oscillations developed by the amplifier 10 produce voltage drops across the resistors 32 and 33 which are applied with opposite polarities to the input electrodes of the respective vacuum tubes 30 and 31. These voltages are amplified by the latter tubes and are applied through the transformer 34 to the input circuit of the amplifier 10, the repeater 29 operating as a conventional push-pull amplifier. There is, however, a phase shift of 90 degrees of the oscillatory voltages translated through the repeater 29 due to the inductive coupling between the windings of the transformer 34 and the coupling provided by repeater 29 is thus a reactive component. The transformer 34 is connected with such polarity that the reactive component provided by repeater 29 is in phase with, or adds to, that provided by the reference impedance 14 or, if desired, the coupling provided by the repeater 29 may be made more than enough to maintain sustained oscillation of amplifier 10 and the reference impedance 14 is then so connected that its coupling opposes that of the repeater and is adjusted to a value which provides a suitable value of total coupling. The magnitude of the reactive component of coupling furnished by repeater 29 is controlled by a bias voltage developed by the rectifier system 36 from the oscillations applied thereto through the repeater 39. The magnitude of this bias voltage varies with the amplitude of the oscillations produced by amplifier 10 and the bias voltage is applied in the same polarity to the vacuum tubes 30 and 31 to control their transconductance inversely with oscillation amplitude. Consequently, as the amplitude of the oscillations of amplifier 10 tends to increase, a larger bias voltage is developed by the rectifier 36 and applied to the repeater 29 with the result that the magnitude of the reactive component of coupling provided by the repeater 29 is reduced. This reduced feedback causes the amplifier 10 to oscillate less strongly, thus reducing the amplitude of its oscillation. Should the oscillation amplitude tend to decrease, a control bias of less magnitude is developed by the reactifier 36 with consequent increase of the transconductance of the vacuum tubes 30 and 31 and increase of the reactive component of coupling provided by the repeater 29. More feed-back energy is thus applied to the input circuit of the amplifier 10 and the amplitude of its oscillation consequently increases. The automatic amplitude-control system comprising repeater 29 and rectifier 36 thus tends to maintain substantially constant the amplitude of oscillation of the amplifier 10 even though the reactive component of coupling provided by the exploring unit 15 may change.

The indicating system of Fig. 6 is initially adjusted for operation by adjusting the coupling between the windings 18 and 19 of the reference impedance 14 until the anode current of the tubes 30 and 31 is approximately one-eighth to one-quarter the maximum value of direct current permissible in these tubes, this adjustment being made by use of the meter 35. The amplitude of oscillation of the amplifier 10 with this adjustment is such that the bias voltage developed by the rectifier 36 biases the vacuum tubes 30 and 31 to a value corresponding to about one-half the maximum transconductance of these tubes, thus insuring that the repeater 29 normally operates somewhere near the middle of its transconductance range. Due to the action of the repeater 29 and rectifier 36, it will be found that the reference impedance 14 has greatly reduced effect in controlling the amplitude of oscillation of the amplifier 10. On the other hand, it will also be found that the total reactance component of coupling, which is the sum of the reactance components provided by the repeater 29 and the reference impedance 14, is just sufficient to maintain oscillation of the amplifier 10 and that this value of reactance component is automatically maintained by the action of the repeater 29 and rectifier 36. This small value of reactance component insures optimum sensitivity of the indicating system to resistance components of coupling occurring in the exploring unit 15. The reference impedance 14 having once been adjusted, as described, does not need further attention over long periods of operation of the indicating system. The only other initial adjustment which need be made to place the indicating system in condition for operation, and this adjustment may be necessary each time the indicating system is placed in operation, is the adjustment of the phase adjustor 23. This last-named adjustment is made in the same manner and for the same purpose as described in connection with the Fig. 1 arrangement. The operation of the Fig. 6 modification is otherwise essentially the same as that of Fig. 1 and will not be repeated.

The automatic amplitude-control system, comprising the repeater 29 and rectifier 36 of the Fig. 6 modification of the invention, has the important advantage that it provides a coupling component of the same phase as that which normally maintains oscillations and the automatic bias developed by the rectifier 36 limits the amplitude of oscillation by compensating for any change in the total value of this component applied to the input circuit of amplifier 10. This insures that the amplifier 10 shall be maintained in continuous oscillation for any reasonable amount of change of coupling arising from causes external to the indicating system.

The only changes necessary to adapt the Fig. 6 arrangement to be responsive to bodies exhibiting magnetic permeability, that is to reactance components of coupling produced in the exploring unit 15, is to replace the transformer type of reference impedance 14 with the coupling-resistor type of reference impedance, as the coupling resistor 28 of the Fig. 5 modification, and to replace the transformer 34 with resistors to couple the output circuit of tubes 30 and 31 in a conventional push-pull arrangement to the input circuit of amplifier 10.

It is occasionally desirable to bury a non-conductive-nonmagnetic object at a spot which cannot be conveniently marked but which must be accurately located at some future time. The indicating system of the present invention is particularly suited for this purpose. Fig. 7 represents a novel application of this nature. Here a nonconductive-nonmagnetic object B is buried and with it is buried a fixed-tuned circuit 47 sharply resonant at a frequency within the operating frequency range of the system. A similarly buried object B' also has buried with it a fixed-tuned circuit 48 sharply resonant at the same or a different frequency. Assume, for example, that the circuit 47 is tuned to 100 kilocycles and the circuit 48 to 110 kilocycles. The indicating system of the invention, which may be of either the Fig. 1 or Fig. 6 types and is indicated in Fig. 7 in schematic manner as 49, is adjusted for operation at the frequency of the buried tuned circuit associated with the object to be located. Under the conditions assumed, if the indicating system is adjusted for operation at 100 kilocycles and the exploring unit 15 is moved into the vicinity of the tuned circuit 47, the impedance of the latter at this frequency is predominantly resistive and it, therefore, introduces a resistance component of coupling in the exploring unit of the system, thus to provide an indication that the tuned circuit 47 is within the vicinity of the exploring unit. However, should the exploring unit 15 of the indicating system be moved, as indicated in broken lines, into the vicinity of the tuned circuit 48 associated with the buried object B', the impedance of the tuned circuit 48 is predominantly reactive at 110 kilocycles and consequently only a reactance component of coupling is produced in the exploring unit 15 by this tuned circuit. Only the amplitude of oscillation of the system is thus affected and no resultant indication is provided. It may be noted in this regard that the tuned circuit 48 has a predominantly reactance component of impedance at any frequency which differs appreciably from its resonant frequency. Thus, an element of secrecy is introduced in that the buried object cannot readily be located, even with the indicating system of the invention, unless the resonant frequency of the buried tuned circuit is known.

The sensitivity of either the Fig. 1 or Fig. 6 arrangement can be increased by using a frequency-multiplier stage between the output circuit of the amplifier 10 and the input circuit of the beat-note indicator 21 to provide from the oscillations of amplifier 10 other oscillations of higher frequency. The operating frequency of the oscillator 20 is, of course, increased by the same amount. A small change of the frequency of oscillation of amplifier 10 then produces a much larger change of frequency of the oscillations applied to the indicator 21 to cause a beat note of higher frequency to be developed between these oscillations and the oscillations of oscillator 20.

While the exploring unit 15 is preferably so constructed that its inductors 16 and 17a—17b normally have substantially no coupling and the major component of coupling necessary to maintain oscillation of amplifier 10 is provided by the reference impedance 14 in Figs. 1 and 6, or the reference impedance comprising the coupling resistor 28 in Fig. 5, it will be understood that the major component of coupling may be provided primarily by a small coupling initially provided between the inductors of the exploring unit 15 by suitable design of the latter. In this case, the reference impedance may be omitted from the system. Optimum sensitivity of the system, however, requires a carefully controlled value of the major component of coupling and this is most readily and easily effected by the use of the reference impedance.

As illustrative of specific embodiments of the invention, the following circuit constants are given for the embodiments of the invention of the types shown in Figs. 1 and 6:

Mutual inductance of reference impedance 14__________ ±0.1 microhenry
Exploring unit 15:
    Inductor 16—
        Diameter ______________ 7½ inches
        Number of turns_____ 80
        Inductance __________ 2.8 millihenries
        Resistance __________ 4 ohms
    Inductor section 17a—
        Diameter ______________ 4¼ inches
        Number of turns_____ 80
        Inductance __________ 1.9 millihenries
    Inductor section 17b—
        Diameter ______________ 12 inches
        Number of turns_____ 50
        Inductance __________ 2.3 millihenries
    Inductor sections 17a and 17b—
        Total inductance_____ 3.4 millihenries
        Total resistance_______ 8 ohms
Resistor 26_________________ 100 ohms
Resistors 43, 44, 45, 46, each__ 0.1 megohm
Resistors 32, 33, each_________ 1 ohm
Tubes 30, 31________________ 1N5GT Type
Transformer 34 _____________ Air-core windings of fine wire, paper-layer construction Operating frequency:
    $\Delta\phi=0$ __________________ 1000 cycles
    $\Delta\phi=\pm 90$ degrees _________ $1000\pm 350$ cycles While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, means included in said feed-back path for establishing a feed-back component of coupling of a type effective primarily to cause sustained oscillation of said amplifier at a frequency in said range but ineffective to cause substantial variations of the oscillation frequency of said amplifier with variations of said component, and means included in said feed-back path for establishing a second component of feed-back coupling substantially independent of and in quadrature relation to said first-mentioned component, said second component being variable in response to a frequency-control condition external to said last-mentioned means and being effective primarily to cause variations of the frequency of oscillation in accordance with variations of said condition.

2. A variable-frequency oscillatory system comprising, a stable amplifier having input and output terminals and having substantial amplification and a relatively small positive phase slope over a predetermined frequency range, a single feed-back path substantially nonselective over said range coupling said output terminals to said input terminals, means included in said feed-back path for establishing a feed-back component of coupling of a type effective primarily to cause sustained oscillation of said amplifier at a frequency in said range but ineffective to cause substantial variations of the oscillation frequency of said amplifier with variations of said component, and means included in said feed-back path for establishing a second component of feed-back coupling substantially independent of and in quadrature relation to said first-mentioned component, said second component being variable in response to a frequency-control condition external to said last-mentioned means and being effective primarily to cause variations of the frequency of oscillation in accordance with variations of said condition.

3. A variable-frequency oscillatory system comprising, a stable amplifier having input and output terminals and having over a predetermined frequency range substantial amplification and a positive phase slope the values of which are substantially independent of the amplitude of oscillations translated by said amplifier, a single feed-back path substantially nonselective over said range coupling said output terminals to said input terminals, means included in said feed-back path for establishing a feed-back component of coupling of a type effective primarily to cause sustained oscillation of said amplifier at a frequency in said range but ineffective to cause substantial variations of the oscillation frequency of said amplifier with variations of said component, and means included in said feed-back path for establishing a second component of feed-back coupling substantially independent of and in quadrature relation to said first-mentioned component, said second component being variable in response to a frequency-control condition external to said last-mentioned means and being effective primarily to cause variations of the frequency of oscillation in accordance with variations of said condition.

4. A variable-frequency oscillatory system comprising, a stable amplifier having input and output terminals and a single selective circuit broadly resonant over a predetermined frequency range and having substantial amplification, a single feed-back path substantially nonselective over said range coupling said output terminals to said input terminals, means included in said feed-back path for establishing a feed-back component of coupling of a type effective primarily to cause sustained oscillation of said amplifier at a frequency in said range but ineffective to cause substantial variations of the oscillation frequency of said amplifier with variations of said component, and means included in said feed-back path for establishing a second component of feed-back coupling substantially independent of and in quadrature relation to said first-mentioned component, said second component being variable in response to a frequency-control condition external to said last-mentioned means and being effective primarily to cause variations of the frequency of oscillation in accordance with variations of said condition.

5. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, means included in said feed-back path for establishing one of a reactance and resistance component of feed-back coupling effective primarily to cause sustained oscillation of said amplifier at a frequency in said range but ineffective to cause substantial variations of the oscillation frequency of said amplifier with variations of said one component, and means included in said feed-back path for establishing the other of said reactance and resistance components, said other component being variable in response to a frequency-control condition external to said last-mentioned means and being effective primarily to cause variations of the frequency of oscillation in accordance with variations of said condition.

6. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, means included in said feed-back path for establishing a reactance component of feed-back coupling effective primarily to cause sustained oscillation of said amplifier at a frequency in said range, and means in said feed-back path for establishing a resistance component of feed-back coupling variable in response to a frequency-control condition external to said last-mentioned means and effective primarily to cause variations of the frequency of oscillation in accordance with variations of said condition, variations of said reactance component of coupling being ineffective in the absence of said resistance component of coupling to cause substantial variations of the frequency of oscillation of said amplifier.

7. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, means included in said feed-back path for establishing a resistance component of feed-back coupling effective primarily to cause sustained oscillation of said amplifier at a frequency in said range, and means in said feed-back path for establishing a reactance component of feed-back coupling variable in response to a frequency-control condition external to said last-mentioned means and effective primarily to cause variations of the frequency of oscillation in accordance with variations of said condition, variations of said resistance component of coupling being ineffective in the absence of said reactance component of coupling to cause substantial variations of the frequency of oscillation of said amplifier.

8. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, a coupling impedance included in said feed-back path for establishing a feed-back component of coupling of a type effective primarily to cause sustained oscillation of said amplifier at a frequency in said range but ineffective to cause substantial variations of the oscillation frequency of said amplifier with variations of said component, and a second coupling impedance included in said feed-back path for establishing a second component of feed-back coupling independent of and in quadrature relation to said first-mentioned component, said second component being variable in response to a frequency-control condition external to said second coupling impedance and being effective primarily to cause variations of the frequency of oscillation in accordance with variations of said condition.

9. A variable-frequency oscillatory system comprising, a stable amplifier having input and output terminals and having substantial amplification and a positive phase slope over a predetermined frequency range, a single feed-back path substantially nonselective over said range and coupling said output terminals to said input terminals, and a coupling impedance included in said feed-back path and having two independent impedance portions which provide individual ones of quadrature-related components of feed-back coupling of which one component is effective primarily to cause sustained oscillation of said amplifier at a frequency in said range and variations of said one component in the absence of the other component are ineffective to cause substantial variations of the oscillation frequency of said amplifier while the other component is variable in response to a frequency-control condition external to said coupling impedance and is effective primarily to cause variations of the frequency of oscillation in accordance with variations of said condition.

10. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, and means included in said feed-back path for independently establishing quadrature-related components of feed-back coupling of which one component is effective primarily to cause sustained oscillation of said amplifier at a frequency in said range and variations of said one component in the absence of the other component are ineffective to cause substantial variations of the oscillation frequency of said amplifier while the other component is variable in response to a frequency-control condition external to said last-mentioned means and is effective primarily to cause variations of the frequency of oscillation in accordance with variations of said condition, said last-mentioned means comprising an auxiliary reference impedance providing primarily said one component of coupling and a pair of inductors normally having substantially no coupling but becoming coupled in response to said condition to provide primarily said other component of coupling.

11. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, and means included in said feed-back path for independently establishing quadrature-related components of feed-back coupling of which one component is effective primarily to cause sustained oscillation of said amplifier at a frequency in said range and variations of said one component in the absence of the other component are ineffective to cause substantial variations of the oscillation frequency of said amplifier while the other component is variable in response to a frequency-control condition external to said last-mentioned means and is effective primarily to cause variations of the frequency of oscillation in accordance with variations of said condition, said last-mentioned means comprising a first pair of coupled inductors providing primarily said one component of coupling and a second pair of inductors normally having substantially no coupling but becoming coupled in response to said condition to provide primarily said other component of coupling.

12. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, means included in said feed-back path for establishing a feed-back component of coupling of a type effective primarily to cause sustained oscillation of said amplifier at a frequency in said range but ineffective to cause substantial variations of the oscillation frequency of said amplifier with variations of said component, and means included in said feed-back path for establishing a second component of feed-back coupling substantially independent of and in quadrature relation to said first-mentioned component, said second component being variable in response to a frequency-control condition external to said last-mentioned means and being effective primarily to cause variations of the frequency of oscillation in accordance with variations of said condition, and means included in said amplifier for adjusting the phase shift of oscillations translated therethrough from said input to said output terminals to adjust the frequency of oscillation of said amplifier.

13. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, and means included in said feed-back path for independently establishing quadrature-related components of feed-back coupling of which one component is effective primarily to cause sustained oscillation of said amplifier at a frequency in said range and variations of said one component in the absence of the other component are ineffective to cause substantial variations of the oscillation frequency of said amplifier while the other component is variable in response to a frequency-control condition external to said last-mentioned means and is effective primarily to cause variations of the frequency of oscillation in accordance with variations of said condition, said last-mentioned means comprising a pair of inductors normally having substantially no coupling but becoming coupled in response to said condition to provide primarily said other component of coupling and a resistor included in a circuit portion common to each of said inductors and providing primarily said one component of coupling.

14. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, means included in said feed-back path for independently establishing quadrature-related components of feed-back coupling of which one component is effective primarily to cause sustained oscillation of said amplifier at a frequency in said range and variations of said one component in the absence of the other component are ineffective to cause substantial variations of the oscillation frequency of said amplifier while the other component is variable in response to a frequency-control condition external to said last-mentioned means and is effective primarily to cause variations of the frequency of oscillation in accordance with variations of said condition, and means responsive to the amplitude of oscillation of said amplifier for automatically maintaining the oscillation amplitude thereof substantially constant.

15. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, means included in said feed-back path for independently establishing quadrature-related components of feed-back coupling of which one component is effective primarily to cause sustained oscillation of said amplifier at a frequency in said range and variations of said one component in the absence of the other component are ineffective to cause substantial variations of the oscillation frequency of said amplifier while the other component is variable in response to a frequency-control condition external to said last-mentioned means and is effective primarily to cause variations of the frequency of oscillation in accordance with variations of said condition, and means responsive to the amplitude of oscillation of said amplifier for automatically adjusting the magnitude of said one component of coupling inversely therewith to maintain the oscillation amplitude of said amplifier substantially constant.

16. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, means included in said feed-back path for independently establishing quadrature-related components of feed-back coupling of which one component is effective primarily to cause sustained oscillation of said amplifier at a frequency in said range and variations of said one component in the absence of the other component are ineffective to cause substantial variations of the oscillation frequency of said amplifier while the other component is variable in response to a frequency-control condition external to said last-mentioned means and is effective primarily to cause variations of the frequency of oscillation in accordance with variations of said condition, said last-mentioned means including a vacuum-tube repeater in said feed-back path to provide said one component of coupling, and means for controlling the repeating ratio of said repeater to control the amplitude of oscillation of said amplifier.

17. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, means included in said feed-back path for independently establishing quadrature-related components of feed-back coupling of which one component is effective primarily to cause sustained oscillation of said amplifier at a frequency in said range and variations of said one component in the absence of the other component are ineffective to cause substantial variations of the oscillation frequency of said amplifier while the other component is variable in response to a frequency-control condition external to said last-mentioned means and is effective primarily to cause variations of the frequency of oscillation in accordance with variations of said condition, said last-mentioned means including a bias-controlled repeater in said feed-back path to provide said one component of coupling, and means for deriving a control bias varying with the amplitude of oscillation and for utilizing said bias to control the repeating ratio of said repeater inversely with oscillation amplitude to maintain the oscillation amplitude of said amplifier substantially constant.

18. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, means included in said feed-back path for independently establishing quadrature-related components of feed-back coupling of which one component is effective primarily to cause sustained oscillation of said amplifier at a frequency in said range and variations of said one component in the absence of the other component are ineffective to cause substantial variations of the oscillation frequency of said amplifier while the other component is variable in response to a frequency-control condition external to said last-mentioned means and is effective primarily to cause variations of the frequency of oscillation in accordance with variations of said condition, said last-mentioned means including a pair of vacuum tubes having input electrodes coupled in push-pull to said output terminals and having output electrodes coupled in push-pull to said input terminals to provide said one component of coupling, rectifier means coupled to said output terminals to derive a control effect varying with the amplitude of oscillation of said amplifier, and means for applying said control effect in the same polarity to the input electrodes of said vacuum tubes to maintain the amplitude of oscillation of said amplifier substantially constant.

19. A variable-frequency oscillatory system comprising, a stable amplifier having input and output terminals and having substantial amplification and a positive phase slope over a predetermined frequency range, a single feed-back path substantially nonselective over said range coupling said output terminals to said input terminals, means included in said feed-back path for independently establishing quadrature-related components of feed-back coupling of which one component is effective primarily to cause sustained oscillation of said amplifier at a frequency in said range and variations of said one component in the absence of the other component are ineffective to cause substantial variations of the oscillation frequency of said amplifier while the other component is variable in response to a frequency-control condition external to said last-mentioned means and is effective primarily to cause variations of the frequency of oscillation in accordance with variations of said condition, said last-mentioned means including a pair of vacuum tubes having input electrodes coupled in push-pull to said output terminals and having output electrodes coupled in push-pull to said input terminals to provide said one component of coupling, a balanced rectifier coupled to said output terminals to derive a control effect varying with the amplitude of oscillation of said amplifier, and means for applying said control effect in the same polarity to the input electrodes of said vacuum tubes to maintain the amplitude of oscillation of said amplifier substantially constant.

HAROLD A. WHEELER.

REFERENCES CITED

The following references are of record in the file of this patent:

UNITED STATES PATENTS

| Number | Name | Date |
|---|---|---|
| 1,984,465 | Dana | Dec. 18, 1934 |
| 2,018,080 | Martienssen | Oct. 22, 1935 |
| 2,027,291 | Robinson | Jan. 7, 1936 |
| 2,048,591 | Berry | July 21, 1936 |
| 2,146,073 | Jennens et al. | Feb. 7, 1939 |
| 2,220,070 | Aiken | Nov. 5, 1940 |
| 2,222,182 | Mounce et al. | Nov. 19, 1940 |
| 2,267,884 | Zuschlog | Dec. 30, 1941 |
| 2,271,951 | Pearson et al. | Feb. 3, 1942 |
| 2,364,957 | Douglas | Dec. 12, 1944 |

OTHER REFERENCES

Terman et al., Proceedings of the Institute of Radio Engineers, pages 649–655, Oct. 1939.